(12) United States Patent
Mizota et al.

(10) Patent No.: US 6,632,907 B1
(45) Date of Patent: Oct. 14, 2003

(54) PROCESS FOR PRODUCING METHACRYLIC POLYMER

(75) Inventors: Hirotoshi Mizota, Hiroshima (JP); Shigeaki Sasaki, Toyama (JP); Tomonari Murakami, Hiroshima (JP); Kouzi Ishizaka, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/674,265

(22) PCT Filed: Jul. 12, 1999

(86) PCT No.: PCT/JP99/03746

§ 371 (c)(1),
(2), (4) Date: Oct. 30, 2000

(87) PCT Pub. No.: WO00/04054

PCT Pub. Date: Jan. 27, 2000

(30) Foreign Application Priority Data

Jul. 14, 1998 (JP) ............................................. 10-198594

(51) Int. Cl.⁷ .............................................. C08F 118/02
(52) U.S. Cl. ........................ 526/319; 526/64; 526/65; 526/66; 526/317.1; 526/318.1; 526/258; 526/328
(58) Field of Search ................................ 526/319, 328, 526/258, 317.1, 318.1, 65, 64, 66

(56) References Cited

U.S. PATENT DOCUMENTS 3,900,453 A  *  8/1975  Shimada et al. ............ 264/148
5,886,122 A  *  3/1999  Oka et al. ................... 526/258

FOREIGN PATENT DOCUMENTS

| JP | 49-37993 |   | 4/1974 |
| JP | 54090284 | * | 7/1979 |
| JP | 58-132002 |   | 8/1983 |
| JP | 06128327 | * | 5/1994 |
| JP | 06-239938 |   | 8/1994 |

* cited by examiner

Primary Examiner—Tatyana Zalukaeva
(74) Attorney, Agent, or Firm—Oblon, Spivak, McClelland, Maier & Neustadt, P.C.

(57) ABSTRACT

The present invention relates to a process for the production of methacrylic polymers which comprises the steps of, in one perfect mixing type reactor, effecting continuous bulk polymerization at a polymerization temperature of 110 to 160° C. by using a chain-transfer agent having a specific concentration and a radical initiator having a specific half-life, so that the polymer content may be in the range of 35 to 65% by weight; withdrawing the reaction mixture continuously and feeding the reaction mixture to a plug flow type reactor while pressurizing it so that the pressure of the reaction mixture is not less than a certain level throughout the plug flow type reactor; in the plug flow type reactor, presetting the inner wall temperature of the reactor at a specific temperature and passing the reaction mixture through the reactor while polymerizing it by using a radical initiator having a specific half-life, so that the polymer content at the outlet may be in the range of 50 to 85% by weight; and subsequently separating and removing volatile matter continuously from the reaction mixture. According to the present invention, methacrylic polymers having excellent moldability can be produced with good productivity.

13 Claims, No Drawings

PROCESS FOR PRODUCING METHACRYLIC POLYMER

TECHNICAL FIELD

This invention relates to a process for the continuous production of methacrylic polymers by bulk polymerization.

BACKGROUND ART

The continuous polymerization of polymethyl methacrylate (PMMA) by bulk polymerization has for long been intensively investigated for the reasons that it has more excellent productivity as compared with batchwise suspension polymerization, that the resulting polymer has very high transparency because no dispersant or other assistant is required, that it does not require the separation of the reaction solvent as contrasted with solution polymerization, that the resulting polymer has very high transparency because no residual solvent is present in the polymer after the removal of volatile matter, and that it yields a polymer having excellent thermal decomposition resistance because the amount of radical initiator supplied to the reaction zone may be very small.

On the other hand, solution polymerization has for long been investigated for the reason that, although it yields a polymer having poorer thermal decomposition resistance and poorer moldability as compared with bulk polymerization, it facilitates the control of polymerization.

For example, JP-B 52-32665 discloses a process in which the half-life at the polymerization temperature of the radical initiator used and the amount of radical initiator added are specified, and polymerization is carried out at 130–160° C. in one perfect mixing type reactor so as to give a degree of monomer conversion of 50 to 70%.

Moreover, JP-A 3-111408 discloses a process in which, using a short-lived radical initiator having a half-life period of 0.5 to 120 seconds at the polymerization temperature, polymerization is carried out at 130–160° C. in one perfect mixing type reactor so as to give a degree of monomer conversion of 45 to 70%.

Generally, it is known that, in the bulk polymerization of methyl methacrylate, the gel effect causes the reaction rate to be accelerated as the degree of conversion becomes higher. Consequently, when bulk polymerization is carried out by using one perfect mixing type reactor, a critical degree of conversion up to which operation can be carried out under stable control over the reaction exists for each polymerization temperature. Accordingly, in both of the processes described in the aforementioned JP-B 52-32665 and JP-A 3-111408, the polymerization reaction must unavoidably be carried out at or below such a critical degree of conversion. When it is desired to achieve high productivity preferentially under this limitation, there is employed a method for maintaining a high degree of conversion by raising the polymerization temperature.

However, in order to improve polymer properties desired for molding materials, it is necessary to carry out polymerization at a low temperature which can decrease the contents of dimers and terminal double bonds. To this end, the polymerization temperature must be lowered. This will produce a problem in that a lower polymerization temperature reduces the degree of conversion and hence detracts from productivity.

Moreover, in JP-A 54-90284, there is described a bulk polymerization process comprising the steps of effecting polymerization in an intimate agitation type reactor at a temperature of 120 to 200° C. to a degree of conversion of 30 to 80% by weight, and subsequently effecting polymerization in a plug flow type reactor at a temperature of 120 to 200° C. to a degree of conversion of not less than 90% by weight. In practice, however, our investigation on the continuous bulk polymerization of methyl methacrylate has revealed that it is extremely difficult to produce a polymer stably in a plug flow type reactor at a degree of conversion of not less than 90% and, moreover, it is very difficult to produce a polymer having excellent quality with good productivity.

Moreover, in JP-B 59-21325 and JP-B 1-49295, there are described processes for producing a methyl methacrylate-based syrup continuously by using one perfect mixing type reactor and a succeeding plug flow type reactor. The processes described in these publications are ones for producing a syrup which is a precursor for the formation of sheets by casting and polymerization. In these processes, the plug flow type reactor is installed for the purpose of decomposing the residual initiator present in the syrup leaving the first-stage perfect mixing type reactor and thereby producing a stable syrup which does not undergo postpolymerization. Thus, the object of the processes described in these publications is to produce a syrup containing no residual initiator and having good fluidity in an economical manner. Accordingly, the second-stage in plug flow type reactor does not involve the supply of an additional radical initiator, and the final degree of conversion is as low as 40% by weight or less. If a methacrylic polymer is produced according to the teachings of these publications and used as a molding material, the resulting polymer will have a high terminal double bond content and hence markedly poor thermal decomposition resistance because the polymerization time is extremely short and the amount of radical initiator used is extremely large. Thus, this polymer is disadvantageous from the viewpoint of properties.

As to continuous solution polymerization, processes for carrying out continuous polymerization in a perfect mixing type reactor by using 10 to 25% by weight of an inert solvent are described in JP-A 63-57613 and JP-A 1-79209; processes for carrying out polymerization in one perfect mixing type reactor and a succeeding perfect mixing type reactor or plug flow type reactor by using 5 to 29% by weight of an inert solvent are described in JP-A 7-206906 and JP-A 8-253507; a process for carrying out continuous polymerization in two or more reactors by using not less than 40% by weight of an inert solvent is described in JP-A 1-172401; and a process for the production of methacrylic polymers by using a perfect mixing tank and a plug flow type reactor connected in series therewith and by carrying out continuous polymerization in the presence of 10 to 40% by weight of a solvent is described in JP-B 40-22200. In all of the processes described in these publications, at least 5% by weight, mostly not less than 10% by weight, of a solvent is used to suppress the gel effect and thereby facilitate the control of the reaction. However, the processes using not less than 5% by weight of a solvent involve various problems in that they have low productivity owing to a slow polymerization rate and are hence disadvantageous from an economic point of view, that a radical initiator is used in large amounts to cause an increase in the terminal double bond content of the polymer and hence a reduction in thermal decomposition resistance, and that the separation and recovery of a large amount of solvent is required to impose a heavy burden on the volatile matter separation step.

Furthermore, JP-A 58-132002 discloses a process for carrying out continuous polymerization in a special reactor formed by the integration of a perfect mixing type reactor with a plug flow type reactor, while using 1 to 30% by weight of methyl isobutyrate as an inert solvent. However, this process requires the use of a special screw agitator in the plug flow type reactor and is hence disadvantageous from an economic point of view. Moreover, it is difficult to increase the capacity of this process to an industrial scale.

DISCLOSURE OF THE INVENTION

The present invention has been made in view of the above-described problems of the prior art, and an object thereof is to provide a process for producing methacrylic polymers having excellent moldability with good productivity.

The present invention relates to a process for production of methacrylic polymers wherein a homopolymer of methyl methacrylate or a copolymer containing methyl methacrylate units and alkyl acrylate units or alkyl methacrylate units (exclusive of methyl methacrylate units) is produced by using one perfect mixing type reactor, a plug flow type reactor and a volatile matter removing device which are arranged in series, said process comprising the steps of:

a) reducing the dissolved oxygen content in the monomer (s) or monomer-containing mixture to 2 ppm or less;

b) in the perfect mixing type reactor, effecting continuous solution polymerization using less than 5% by weight of an inert solvent or continuous bulk polymerization at a polymerization temperature of 110 to 160° C., by using a mercaptan compound of 0.01 to 1.0 mole % as a chain-transfer agent and a radical initiator having a half-life period of 10 seconds to 1 hour at the polymerization temperature and by agitating the reaction mixture to make it substantially homogeneous, so that polymer contents in this reaction zone may be in the range of 35 to 65% by weight;

c) withdrawing a reaction mixture produced in the previous step continuously by means of a pump, and feeding the reaction mixture to the plug flow type reactor while pressurizing it so that the pressure of the reaction mixture is not less than its vapor pressure throughout the plug flow type reactor;

d) in the plug flow type reactor, presetting the inner wall temperature of the plug flow type reactor at a value ranging from said polymerization temperature in the first-stage perfect mixing type reactor to 250° C., and passing the reaction mixture through the plug flow type reactor while polymerizing it by adding thereto and mixing therewith one or more radical initiators having a half-life period of not greater than 1,000 seconds at the inner wall temperature of the plug flow type reactor, so that polymer contents at the outlet of the plug flow type reactor may be in the range of 50 to 85% by weight; and e) subsequently feeding the resultantly reaction mixture to the volatile matter removing device where any volatile matter is separated and removed continuously.

The present invention can provide methacrylic polymers having high transparency and excellent moldability, as well as an economically advantageous production process.

BEST MODE FOR CARRYING OUT THE INVENTION

The production process of the present invention is applicable to the production of methacrylic polymers, namely methyl methacrylate homopolymer and copolymers. In the case of copolymers, it is preferably applied to the production of copolymers containing not less than 80% by weight of methyl methacrylate units and not greater than 20% by weight of alkyl acrylate units or alkyl methacrylate units (exclusive of methyl methacrylate).

Each of the aforesaid polymers is obtained by the homopolymerization of methyl methacrylate used as a monomer, or by the copolymerization of a monomer mixture containing methyl methacrylate and an alkyl acrylate or an alkyl methacrylate (exclusive of methyl methacrylate units) as monomers.

In the case of copolymerization, the alkyl acrylate used in combination with methyl methacrylate is selected from alkyl acrylates having an alkyl group of 1 to 18 carbon atoms. Specific examples thereof include alkyl acrylates having alkyl groups such as methyl, ethyl, n-propyl, n-butyl, 2-ethylhexyl, dodecyl and stearyl.

The alkyl methacrylate used in combination with methyl methacrylate is selected from alkyl methacrylates having an alkyl group of 2 to 18 carbon atoms. Specific examples thereof include alkyl methacrylates having the same alkyl groups as described above, except methyl.

Preferred examples of the methacrylic polymers obtained according to the present invention include the homopolymer of methyl methacrylate, namely polymethyl methacrylate, and copolymers of methyl methacrylate and an alkyl acrylate selected from methyl, ethyl and butyl acrylates.

The polymerization activity of methyl methacrylate is different from those of other alkyl methacrylates and alkyl acrylates copolymerized therewith. Accordingly, where it is desired to obtain a copolymer having the above-described composition, the composition of the charged monomer mixture should be suitably chosen according to the polymerization activities of the monomers. For example, when methyl methacrylate is copolymerized with methyl acrylate or ethyl acrylate, the composition of the charged monomer mixture is preferably determined so as to comprise not less than 70% by weight of methyl methacrylate and not greater than 30% by weight of methyl acrylate or ethyl acrylate.

In the practice of the present invention, the content of dissolved oxygen is first reduced to 2 ppm or less by introducing an inert gas (e.g., nitrogen) into the starting monomer(s) or by keeping the starting monomer(s) under reduced pressure for a predetermined period of time. In the case of solution polymerization using an inert solvent, the content of dissolved oxygen is also reduced to 2 ppm or less by treating the mixture composed of the starting monomer(s) and the inert solvent in the same manner as described above. If the content of dissolved oxygen is greater than 2 ppm, not only the polymerization reaction will not be stabilized, but also colored components may readily be formed in the polymerization step in which the reaction mixture is held at a high temperature for a long period of time. Preferably, it is reduced to 1 ppm or less.

The monomer(s) or monomer-containing mixture from which dissolved oxygen has been removed in the above-described manner is mixed with a mercaptan compound as a chain-transfer agent, and a radical polymerization initiator. The resulting monomer-containing mixture consisting mainly of methyl methacrylate is continuously fed to one perfect mixing type reactor (hereinafter appropriately referred to as "the first reactor").

The mercaptan compounds which can be used in the present invention may be selected from mercaptans having 3 to 18 carbon atoms, which include primary, secondary and tertiary mercaptans having an alkyl group or a substituted alkyl group, such as n-butyl mercaptan, isobutyl mercaptan, n-octyl mercaptan, n-dodecyl mercaptan, sec-butyl mercaptan, sec-dodecyl mercaptan and tert-butyl mercaptan; aromatic mercaptans such as phenyl mercaptan, thiocresol and 4-tert-butyl-o-thiocresol; thioglycollic acid and its esters; and ethylene thioglycol. These mercaptans may be used alone or in admixture of two or more. Among these mercaptans, tert-butyl mercaptan, n-butyl mercaptan, n-octyl mercaptan and n-dodecyl mercaptan are preferred.

Polymers terminated by the chain-transfer reaction of a mercaptan have excellent thermal decomposition resistance, and polymers having more excellent thermal decomposition resistance are obtained as the proportion of terminal mercaptan groups to all terminal groups of the polymer becomes higher. However, if the proportion is unduly high, the resulting polymer will have a reduced degree of polymerization and cause a reduction in product strength. Accordingly, in order to achieve a degree of polymerization suitable for purposes of molding (in the present invention, it is preferable that the weight-average molecular weight of the polymer after the final removal of volatile matter be in the range of 70,000 to 150,000) while retaining product strength, and to obtain a polymer having excellent thermal decomposition resistance, the mercaptan is used in an amount of 0.01 to 1.0 mole %, preferably 0.05 to 0.5 mole %, based on the monomer(s).

When the present invention is carried out by solution polymerization, a well-known solvent such as methanol, ethanol, toluene, xylene, acetone, methyl isobutyl ketone, ethylbenzene, methyl ethyl ketone or butyl acetate may be used as the inert solvent. Especially preferred are methanol, toluene, ethylbenzene, butyl acetate and the like.

The amount of inert solvent used for the purpose of solution polymerization must be less than 5% by weight. Bulk polymerization using no inert solvent is preferred. However, if the amount of solvent used is less than 5% by weight, the effects of the present invention can be produced. That is, it is possible to raise the degree of conversion effectively with the aid of a small amount of a polymerization initiator, without detracting from thermal decomposition resistance (i.e., without suffering from a disadvantage of conventional solution polymerization) and while utilizing the gel effect similarly to bulk polymerization, and also to produce a polymer having excellent thermal decomposition resistance with good productivity. If the amount of inert solvent used is not less than 5% by weight, the gel effect is suppressed as is the case with the prior art and, therefore, the effects of the present invention cannot be produced.

It is important that the radical polymerization initiator used in the perfect mixing type reactor have a half-life period of 10 seconds to 1 hour at the polymerization temperature in the first reactor. If its half-life period is shorter than 10 seconds, most of the radical initiator will be decomposed before it is uniformly dispersed throughout the first reactor, resulting in an undesirable reduction in the utilization efficiency of the radical initiator. Moreover, the amount of oligomers formed will be increased to reduce the thermal decomposition resistance of the resulting methacrylic polymer. It may be possible to increase the intensity of agitation and thereby disperse the radical initiator before it is decomposed. However, this will require very great agitation power and hence bring about an economic disadvantage. Preferably, a radical initiator having a half-life period of not less than 120 seconds is used.

On the other hand, if a radical initiator having a half-life period longer than 1 hour is used, a mass of polymer will tend to be formed within the first reactor and hence make it difficult to carry out the operation stably. Moreover, if the operation is suddenly discontinued owing to a power failure, the polymerization of the reaction mixture will proceed to such an extent that its viscosity becomes high and makes it difficult to restart the operation. Preferably, a radical initiator having a half-life period of not greater than 30 minutes is used.

In the present invention, the "half-life periods at the polymerization temperature" of radical initiators were employed from the values described in well-known product catalogs issued by Nippon Oil & Fats Co., Ltd. and Wako Pure Chemical Industries Ltd.

In the present invention, the radical initiator used in the perfect mixing type reactor has a half-life period of 10 seconds to 1 hour, preferably 120 seconds to 30 minutes, at the polymerization temperature. In the plug flow type reactor which will be described later, a radical initiator having a half-life period of not greater than 1,000 seconds at the inner wall temperature of the plug flow type reactor is used. With consideration for the polymerization temperature, the radical initiator may be selected from among organic peroxides such as tert-butylperoxy 3,5,5-trimethylhexanoate, tert-butylperoxy laurate, tert-butyl peroxyisopropyl monocarbonate, tert-hexyl peroxyisopropyl monocarbonate, tert-butylperoxy acetate, 1,1-bis(tert-butylperoxy)-3,3,5-trimethylcyclohexane, 1,1-bis(tert-butylperoxy) cyclohexane, tert-butylperoxy 2-ethylhexanoate, tert-butylperoxy isobutyrate, tert-hexylperoxy 2-ethylhexanoate, di-tert-butyl peroxide and 2,5-dimethyl-2,5-bis(tert-butylperoxy)hexane; azo compounds such as 2-(carbamoylazo)isobutyronitrile, 1,1'-azobis(1-cyclohexanecarbonitrile), 2,2'-azobisisobutyronitrile, 2,2'-azobis(2-methylbutyronitrile), dimethyl 2,2'-azobisisobutyrate, 2,2'-azobis(2,4,4-trimethylpentane) and 2,2'-azobis(2-methylpropane); and the like.

Moreover, in the production process of the present invention, the reaction mixture introduced into the perfect mixing type reactor must be agitated at a polymerization temperature of 110 to 160° C. so as to make it substantially homogeneous. If the polymerization temperature is lower than 110° C., the acceleration of the polymerization rate due to the gel effect will be increased, so that stable operation can readily be carried out only at a low degree of conversion. This will be economically disadvantageous because of reduced productivity. Preferably, the polymerization temperature is not lower than 120° C.

On the other hand, if this polymerization temperature is higher than 160° C., the polymerization reaction will be stabilized and the degree of conversion can be raised. However, as a result of the formation of a very large amount of dimers, the polymer after the removal of volatile matter will show a reduction in transparency and mechanical strength. Moreover, with respect to the stereoregularity of the polymer, the proportion of syndiotactic polymer will be decreased to cause a reduction in the heat distortion temperature of the polymer. Furthermore, it is known that, as the content of an alkyl acrylate contained in the polymer as a copolymerized component is increased, its heat distortion temperature is reduced, but its thermal decomposition resistance is improved. Generally, when a polymer is produced by using methyl methacrylate and an alkyl acrylate in fixed proportions, lower polymerization temperatures cause an increase in the proportion of syndiotactic polymer and hence a rise in heat distortion temperature. Consequently, if the polymerization temperature is low, a polymer having a heat distortion temperature equal to that of a polymer produced at a high polymerization temperature can be obtained, in spite of the fact that the content of an alkyl acrylate is increased to improve thermal decomposition resistance. Such a copolymer is a polymer combining a high heat distortion temperature with high thermal decomposition resistance and hence having very great industrial superiority. Accordingly, it is more preferable that the polymerization temperature be not higher than 140° C.

The amount of radical initiator used is determined according to the polymerization temperature, the average residence time (or average staying time) and the desired degree of conversion. However, in order to obtain a polymer having a low terminal double bond content and hence excellent thermal decomposition resistance, it is preferable that the upper limit of its amount used be $5.0 \times 10^{-5}$ mole per mole of monomers and the lower limit thereof be $5.0 \times 10^{-6}$ mole with consideration for industrial productivity.

The present invention is preferably practiced in such a way that the average residence time in the perfect mixing type reactor is in the range of 1 to 6 hours. When the average residence time is kept within this range, not only the control of polymerization can be stabilized, but also a polymer having excellent moldability can be produced. If the residence time is shorter than 1 hour, it will be necessary to increase the amount of radical initiator used. An increased amount of radical initiator used not only makes it difficult to control the polymerization reaction, but also makes it difficult to obtain a polymer having excellent thermal decomposition resistance because of an increase in the terminal double bond content of the polymer. More preferably, the average residence time is not less than 2 hours. On the other hand, if the aforesaid average residence time is longer than 6 hours, not only a reduction in productivity will result, but also the formation of dimers will be increased. More preferably, the average residence time is not greater than 5 hours.

Since heat is generated in the reaction zone as a result of polymerization reaction and agitation, the temperature of the first reactor is adjusted to a predetermined polymerization temperature by the removal of heat or, in some cases, by the application of heat. The temperature control may be carried out according to any well-known method. For example, there may be employed any of various methods such as the removal of heat, or application of heat, by a jacket, heat transfer with a heating medium passed through a draft tube or coil installed in the reaction zone, the supply of a cooled monomer mixture, and recirculation cooling.

Furthermore, in the present invention, it is extremely important that, in the perfect mixing type reactor, polymer contents (% by weight) of the reaction mixture, namely the degree of conversion ($\phi$), be maintained at a substantially constant value within a range defined by $35 \leq \phi \leq 65$. If the degree of conversion ($\phi$) is greater than the above-defined upper limit, mixing and heat transfer will not be satisfactorily achieved, making it difficult to carry out stable operation. If the degree of conversion ($\phi$) is less than the above-defined lower limit, the gel effect will not be sufficiently produced in the succeeding plug flow type reactor, resulting in a reduction in final degree of conversion. This increases the cost for separating volatile matter consisting mainly of unreacted monomers, and hence lessens industrial merits. Accordingly, the degree of conversion ($\phi$) must be kept within the above-defined range. Moreover, the preferred conditions permitting methacrylic polymers to be more stably produced with economic advantage are such that the polymerization temperature is in the range of 120 to 140° C. and the degree of conversion ($\phi$) is in the range of 40 to 55% by weight.

The perfect mixing type reactor used in the present invention may comprise a tank type reactor provided with an inlet port, an outlet port and an agitator. The agitator needs to have mixing capability throughout the reaction zone.

In the present invention, further polymerization is subsequently carried out in a plug flow type reactor (hereinafter appropriately referred to as "the second reactor").

In the present invention, the operation for withdrawing the reaction mixture produced in the previous step from the perfect mixing type reactor and feeding it to the plug flow type reactor may be carried out by means of a pump. This pump preferably comprises a commercially available gear pump. The use of a pump for withdrawing the reaction mixture not only permits the reaction mixture to be stably fed to the following step, but also can raise the internal pressure of the subsequently installed plug flow type reactor to a level higher than the vapor pressure of the reaction mixture.

The internal pressure of the plug flow type reactor must be higher than the vapor pressure of the reaction mixture. Preferably, it is in the range of 5 to 40 kg/cm$^2$G and higher than the vapor pressure of the reaction mixture. By maintaining the internal pressure of the second reactor at a level higher than the vapor pressure of the reaction mixture, the reaction mixture can be restrained from foaming and, therefore, the second reactor can be prevented from being blocked with foam.

By allowing further polymerization to proceed in the plug flow type reactor, the final polymer content (or degree of conversion) can be increased to lessen the burden in the following volatile matter removing step. Accordingly, this provides an economically advantageous production process having great industrial merits. Moreover, by allowing further polymerization to proceed in the plug flow type reactor, this process is sufficiently profitable from an economic point of view even if the degree of conversion in the first-stage perfect mixing type reactor is low. Accordingly, this makes it possible to achieve a marked improvement in the heat distortion temperature and thermal decomposition resistance of the polymer by reducing the polymerization temperature of the perfect mixing type reactor.

When further polymerization is allowed to proceed in the plug flow type reactor according to the present invention, it is important to preset the inner wall temperature of this plug flow type reactor at a temperature ranging from the polymerization temperature of the first-stage perfect mixing type reactor to 250° C. If it is lower than the polymerization temperature of the first-stage perfect mixing type reactor, the second reactor may be blocked owing to an increase in viscosity at the wall surface of the second reactor and, therefore, long-term operation will be impossible. If the inner wall temperature of the second reactor is higher than 250° C., the temperature of the reaction mixture will be raised as a result of heat transfer. This causes the radical initiator to be rapidly decomposed and hence makes it impossible to raise the degree of conversion sufficiently. Preferably, it is 200° C. or below.

In the present invention, it is preferable that, according as the temperature of the reaction mixture rises owing to the generation of heat by polymerization, the plug flow type reactor is divided into two or more zones from the inlet toward the outlet of it and the inner wall temperature of one said zone toward the outlet is higher than that of another said zone toward the inlet. This makes it possible to raise the degree of conversion effectively while suppressing the formation of dimers and restraining the radical initiator from being rapidly decomposed.

Moreover, when further polymerization is allowed to proceed in the plug flow type reactor according to the present invention, it is important to add one or more radical initiators having a half-life period of not greater than 1,000 seconds at the inner wall temperature of the second reactor. If this half-life period is longer than 1,000 seconds, the degree of conversion will be raised in that part of the reaction mixture which lies in proximity to the wall surface of the second reactor and hence has low fluidity. If this phenomenon continues for a long period of time, the second reactor may be blocked. In order to avoid such a phenomenon, it is essential that this half-life period be not greater than 1,000 seconds. More preferably, this half-life period is not greater than 500 seconds. On the other hand, if this half-life period is unduly short, no interference will occur from the viewpoint of operation, but the radical initiator(s) will be prompt decomposed to prevent the degree of conversion from being sufficiently raised. Consequently, only dimers are formed during passage through the second reactor, resulting in a polymer having poor properties. For this reason, it is preferable to use radical initiators having a half-life period of not less than 0.1 second.

Furthermore, in the present invention, the polymer is produced in such a way that the final degree of conversion at the outlet of the plug flow type reactor is in the range of 50 to 85% by weight. If this final degree of conversion is less than 50% by weight, it would be economically advantageous to produce the polymer by using only one perfect mixing type reactor. On the other hand, if this final degree of conversion is greater than 85% by weight, the resulting polymer will show a marked reduction in fluidity and, therefore, cannot be conveyed stably. The final degree of conversion is preferably in the range of 55 to 85% by weight and more preferably in the range of 60 to 80% by weight.

In order to practice the present invention more effectively, it is preferable that the plug flow type reactor comprise a tubular reactor having a built-in static mixer. The use of a static mixer not only simplifies the construction of the equipment, but also eliminates the need of power for agitation and associated equipment. This causes a reduction in equipment cost and, moreover, a reduction in running cost. There may be used any commercially available static mixer. Preferred examples thereof include Static Mixer sold by Noritake Ceramics Co., Ltd. and Sulzer Mixer sold by Sumitomo Heavy Industries, Ltd.

The present invention is preferably practiced in such a way that the average residence time of the reaction mixture in this plug flow type reactor is in the range of 1 minute to 1 hour. If this average residence time is shorter than 1 minute, the degree of conversion cannot be sufficiently raised. On the other hand, if this average residence time is longer than 1 hour, this will undesirably cause an increase in the amount of dimers formed and a reduction in productivity.

The preferred method for the addition of the radical initiator used in this plug flow type reactor is such that, at the inlet of the plug flow type reactor, the reaction mixture is preliminarily mixed with the radical initiator by means of a separate static mixer arranged in series therewith, and then passed through the plug flow type reactor.

For this purpose, there may used a single radical initiator or a mixture of two or more radical initiators. When two or more radical initiators are used, it is preferable that the ten-hour half-life period temperature of said each radical initiator differs from each other by 5° C. or more. This enables the polymerization to proceed more efficiently.

Furthermore, it is preferable that, in response to a rise in the temperature of the reaction mixture, one or more radical initiators be added at a position immediately before the inlet of the plug flow type reactor and at one or more positions within the second reactor. This further enables the polymerization to proceed effectively. In this case, it is preferable to add a combination of radical initiators selected so that their half-life periods at the inner wall temperature of the second reactor are not greater than 1,000 seconds and their ten-hour half-life period temperatures become successively longer from its inlet to outlet side.

In this case, it is preferable to add the radical initiators in an amount of $5.0 \times 10^{-6}$ to $5.0 \times 10^{-5}$ mole per mole of the monomers into which convert the amount of the reaction mixture.

In the present invention, it is very important that the plug flow type reactor be operated under conditions falling within the above-described limits. By employing the above-described specific conditions, it has first become possible to stably carry out continuous bulk polymerization at a polymer content of not less than 50% by weight, and continuous solution polymerization using less than 5% by weight of an inert solvent, which have been unachievable in the prior art. Moreover, the production process of the present invention makes it possible to provide methacrylic polymers having excellent thermal decomposition resistance and good moldability with industrial advantage.

Following the above-described polymerization steps, the production process of the present invention includes a step for separating and removing volatile matter consisting mainly of unreacted monomer(s). Preferably, the continuously fed reaction mixture having a predetermined degree of conversion is heated at 200 to 290° C. under reduced pressure to continuously separate and remove most of the volatile matter consisting mainly of unreacted monomer(s).

As a result of this separation and removal step, the contents of dimers and residual monomer(s) constituting volatile matter in the polymer are reduced to not greater than 1,000 ppm and not greater than 3,000 ppm, respectively. If their contents are outside these ranges, not only the heat distortion temperature will be reduced, but also molding defects such as silver blisters will tend to appear and hence cause a reduction in moldability. Moreover, it is preferable to reduce the amount of residual mercaptan to not greater than 50 ppm. This can restrain the polymer from being colored by heating during molding.

In order to develop good moldability without detracting from mechanical strength, the weight-average molecular weight of the polymer obtained by the production process of the present invention is preferably in the range of 70,000 to 150,000.

When the methacrylic polymer produced in the above-described manner is used as a molding material, lubricants such as higher alcohols and higher fatty acid esters may be added thereto. Moreover, ultraviolet absorbers, thermal stabilizers, colorants, antistatic agents and the like may also be added thereto as required.

The methacrylic polymers obtained according to the present invention are characterized in that, when used as molding materials, they exhibit excellent properties and, in particular, excellent moldability. The moldable temperature range of a polymer can be used as a criterion for judging whether its moldability is good or poor, and a wider temperature range represents better moldability.

The lower limit of this temperature range is determined by depending largely on the fluidity of the molding material. This can be relatively easily controlled by varying the average degree of polymerization, the amount of copolymerizable component used, and the amount of plasticizer used. However, if this lower temperature limit is reduced by increasing the fluidity, the heat distortion temperature, the mechanical strength and other properties will concurrently be reduced. In practice, therefore, it is difficult to reduce the lower temperature limit.

On the other hand, the upper limit of the aforesaid temperature range depends on the thermal decomposition resistance and volatile-content of the molding material. Moreover, the thermal decomposition resistance of the polymer is primarily determined by the number of double bonds formed at the polymer ends as a result of the termination reaction of radicals, and the amount of alkyl acrylate copolymerized. Since a polymer having a lower double bond content has more excellent thermal decomposition resistance, it is preferable that the amount of radical initiator added be as small as possible. Moreover, as the number of polymer ends terminated by the chain-transfer reaction of a mercaptan becomes greater, the resulting polymer has more excellent thermal decomposition resistance. Furthermore, as the amount of alkyl acrylate copolymerized is increased, the resulting polymer has more excellent thermal decomposition resistance. However, when the amount of alkyl acrylate copolymerized is increased, the resulting copolymer shows a reduction in glass transition temperature and hence a reduction in heat distortion temperature. Consequently, when a copolymer having a high heat distortion temperature is desired for use as a molding material, there is a limit to the amount of alkyl acrylate copolymerized. Accordingly, in order to increase the amount of alkyl acrylate copolymerized without reducing the heat distortion temperature, the glass transition temperature may be raised by reducing the polymerization temperature and thereby making the tacticity of the resulting polymer syndiotactic-rich. Thus, the amount of alkyl acrylate copolymerized can be increased correspondingly. In order to obtain a methacrylic polymer having a high heat distortion temperature and high thermal decomposition resistance, it is preferable that the ratio of syndiotactic polymer to heterotactic polymer (i.e., the S/H ratio) be not less than 1,22 and not greater than 1.40.

For the above-described reasons, methacrylic polymers combining a high heat distortion temperature with high thermal decomposition resistance and having excellent moldability can be produced at a relatively low polymerization temperature with good productivity. That is, by carrying out polymerization under specific conditions by using one perfect mixing type reactor and a succeeding plug flow type reactor, the present invention has accomplished the object of "producing polymers having excellent moldability while improving productivity", which was not realized in the prior art.

Moreover, in the present invention, the unreacted monomer(s) and inert solvent separated and removed in the volatile matter removing step may be recycled to the first-stage perfect mixing type reactor, which brings about an additional economic advantage.

The present invention can yield methacrylic polymers having excellent thermal decomposition resistance and hence a high upper moldable temperature limit. Accordingly, molding materials having a wide molding temperature range and excellent moldability can be obtained by an industrially superior process.

The methacrylic polymers produced by the process of the present invention can be used in various fields of application, such as illumination, signboards and vehicles, by making the most of their excellent transparency and weather resistance. Recently, they can also be applied to optical uses such as optical lenses, disk substrates and plastic optical fibers. Moreover, the polymers obtained according to the present invention are suitable for the manufacture of large-sized molded articles requiring a long retention time in the cylinder during injection molding, and thin-walled molded articles requiring a high resin temperature.

The present invention is further illustrated by the following examples. However, these examples are not to be construed to limit the scope of the invention.

Properties of the polymers obtained in the examples were evaluated according to the following procedures. (Evaluation of thermal decomposition resistance)

Using an thermogravimetry analysys (SSC500; manufactured by Seiko Electronic Industry Co., Ltd.), a polymer pellet was heated up to 400° C. in air at a heating rate of 5° C./min. Its thermal decomposition resistance was expressed by the bend temperature (° C.).

Determination of Molecular Weight by GPC

An HLC-8020 measuring apparatus (manufactured by Tosoh Corp.) was used together with two GMHLX columns (manufactured by Tosoh Corp.). THF was used as the solvent, and a solution prepared by stationary dissolution and having a concentration of 0.1 g/dl was used as the sample. A working curve was constructed by using TSK Standard Polystyrene (manufactured by Tosoh Corp.). With reference to this working curve, the weight-average molecular weight (Mw) was determined-by means of a commercially available GPC data processor (SC-8010 Data Processor manufactured by Tosoh Corp.).

Measurement of Tacticity

As to the α-methyl signals of the methyl methacrylate component found in the NMR spectrum of a polymer, its tacticity was expressed by the area ratio of the signals assigned to syndiotactic polymer to those assigned to heterotactic polymer (i.e., the S/H ratio).

EXAMPLE 1

Nitrogen was introduced into a monomer mixture composed of 98 wt. % of purified methyl methacrylate and 2 wt. % of methyl acrylate, so that its content of dissolved oxygen was reduced to 0.5 ppm. Thereafter, this monomer mixture was mixed with 0.157 mole % (0.23 wt. %) of n-octyl mercaptan and $1.0 \times 10^{-5}$ mole/mole of monomers (0.003 wt. %) of 1,1-bis(tert-butylperoxy)-3,3,5-trimethylcyclohexane as a radical initiator. This starting monomer mixture was continuously fed to a perfect mixing type reactor controlled so as to have a polymerization temperature of 135° C., and polymerized therein with agitation.

The half-life period of the radical initiator at this polymerization temperature was 230 seconds. The polymerization was carried out in such a way as to give an average residence time of 3.0 hours in the reaction zone.

Subsequently, the reaction mixture was continuously withdrawn from the first reactor. After $6.6 \times 10^{-6}$ mole/mole of monomers (0.002 wt. %) of 1,1-bis(tert-butylperoxy)-3, 3,5-trimethylcyclohexane was further added thereto at a pipeline section having a built-in SMX Sulzer Mixer (manufactured by Sumitomo Heavy Industries, Ltd.), the reaction mixture was fed to a tubular reactor (plug flow type reactor) having a Static Mixer (manufactured by Noritake Ceramics Co., Ltd.) built thereinto.

The inner wall temperature of the tubular reactor was preset at 150° C. The half-life period of the radical initiator at this inner wall temperature was 54 seconds. The average residence time was 30 minutes. The internal pressure was preset at 25 kg/cm²G.

Next, the reaction mixture was continuously fed from the outlet of the tubular reactor to an extruding machine of the vent extruder type at 230° C., where volatile matter consisting mainly of unreacted monomers was separated and removed at 270° C. to obtain a polymer.

When polymer properties were examined in each step, the polymer contents of the reaction mixture at the outlet of the perfect mixing type reactor was 47 wt. %, and the polymer contents at the outlet of the tubular reactor was 58 wt. %. The polymer obtained after the separation of volatile matter had a residual monomer contents of 250 ppm, a residual dimer contents of 300 ppm, and a residual mercaptan contents of 20 ppm.

The evaluation of properties of this polymer yielded results as shown in Table 3, indicating that it was a polymer having very excellent thermal decomposition resistance.

Even during continuous operation for 360 hours, no problem with the control of polymerization was encountered. Moreover, upon observation of the inside of the reactors after completion of the operation, the adhesion of deposits to the equipment or the formation of foreign matter was not recognized.

EXAMPLES 2–6

Polymers having properties as shown in Table 3 were obtained in the same manner as in Example 1, except that the starting materials and conditions shown in Tables 1 and 2 were used. In all of Examples 2–6, no problem with the control of polymerization was encountered during continuous operation for 360 hours. Moreover, upon observation of the inside of the reactors after completion of the operation, the adhesion of deposits to the equipment or the formation of foreign matter was not recognized.

The term "post-addition" as used in Table 2 indicates that, after an initiator was added at a position immediately before the inlet, an initiator was further added at a middle position in the direction of flow of the reaction mixture through the plug flow type reactor.

COMPARATIVE EXAMPLE 1

Nitrogen was introduced into a monomer mixture composed of 98 wt. % of purified methyl methacrylate and 2 wt. % of methyl acrylate, so that its content of dissolved oxygen was reduced to 0.5 ppm. Thereafter, this monomer mixture was mixed with 0.157 mole % (0.23 wt. %) of n-octyl mercaptan and. $1.0 \times 10^{31\ 5}$ mole/mole of monomers (0.0015 wt. %) of di-tert-butyl peroxide as a radical initiator. This starting monomer mixture was continuously fed to a perfect mixing type reactor controlled so as to have a polymerization temperature of 165° C., and polymerized therein with agitation.

The half-life period of the radical initiator at this polymerization temperature was 420 seconds. The polymerization was carried out in such a way as to give an average residence time of 4.0 hours in the reaction zone.

Subsequently, the reaction mixture was continuously withdrawn from the reactor and fed to an extruding machine of the vent extruder type, where volatile matter consisting mainly of unreacted monomers was separated and removed to obtain a polymer.

When polymer properties were examined in each step, the polymer content of the reaction mixture at the outlet of the perfect mixing type reactor was 58 wt. %. The polymer obtained after the separation of volatile matter had a residual monomer content of 300 ppm, a residual dimer content of 2,000 ppm, and a residual mercaptan content of 20 ppm.

The evaluation of properties of this polymer yielded results as shown in Table 3, indicating that it was a polymer having poorer thermal decomposition resistance as compared with that of Example 1.

COMPARATIVE EXAMPLE 2

Nitrogen was introduced into a monomer mixture composed of 98 wt. % of purified methyl methacrylate and 2 wt. % of methyl acrylate, so that its content of dissolved oxygen was reduced to 0.5 ppm. Thereafter, this monomer mixture was mixed with 0.157 mole % (0.23 wt. %) of n-octyl mercaptan and $3.5 \times 10^{-5}$ mole/mole of monomers (0.008 wt. %) of 2,2'-azobisisobutyronitrile as a radical initiator. This starting monomer mixture was continuously fed to a perfect mixing type reactor controlled so as to have a polymerization temperature of 150° C., and polymerized therein with agitation.

The half-life period of the radical initiator at this polymerization temperature was 3.5 seconds. The polymerization was carried out in such a way as to give an average residence time of 4.0 hours in the reaction zone.

Subsequently, the reaction mixture was continuously withdrawn from the reactor and fed to an extruding machine of the vent extruder type, where volatile matter consisting mainly of unreacted monomers was separated and removed to obtain a polymer.

When polymer properties were examined in each step, the polymer content of the reaction mixture at the outlet of the perfect mixing type reactor was 57 wt. %. The polymer obtained after the separation of volatile matter had a residual monomer content of 290 ppm, a residual dimer content of 1,300 ppm, and a residual mercaptan content of 20 ppm.

The evaluation of properties of this polymer yielded results as shown in Table 3, indicating that it was a polymer having poorer thermal decomposition resistance as compared with that of Example 1.

COMPARATIVE EXAMPLES 3 and 4

Polymerization was carried out in the same manner as in Example 1, except that the starting materials and conditions shown in Tables 1 and 2 were used. However, long-term operation was impossible because of a blockage of the tubular reactor.

COMPARATIVE EXAMPLE 5

A polymer having properties as shown in Table 3 was obtained in the same manner as in Example 1, except that solution polymerization was carried out by using the starting materials and conditions shown in Tables 1 and 2. Stable operation was possible, but the results indicate that the polymer thus obtained had markedly poor thermal decomposition resistance.

COMPARATIVE EXAMPLE 6

A polymer having properties as shown in Table 3 was obtained in the same manner as in Example 1, except that the starting materials and conditions shown in Tables 1 and 2 were used. Stable operation was possible, but the results indicate that the polymer thus obtained had markedly poor thermal decomposition resistance.

TABLE 1

| | Composition of starting materials fed to perfect mixing type reactor | | | | | Polymerization conditions | | | |
|---|---|---|---|---|---|---|---|---|---|
| Ex. No. | Methyl methacrylate (wt %) | Comonomer (wt %) | Inert solvent (wt %) | Radical initiator (moles/mole of monomers) | Mercaptan (mole %) | Polymerization temperature (°C.) | Residence time (hr) | Polymer content (wt %) | Half-life period (sec) |
| 1 | 98 | MA 2 | None | (a) $1.0 \times 10^{-5}$ (0.003 wt %) | 0.157 (0.23 wt %) | 135 | 3.0 | 47 | 230 |
| 2 | 98 | MA 2 | None | (a) $1.2 \times 10^{-5}$ (0.0036 wt %) | 0.171 (0.25 wt %) | 130 | 3.0 | 45 | 370 |
| 3 | 98 | MA 2 | None | (a) $1.0 \times 10^{-5}$ (0.003 wt %) | 0.157 (0.23 wt %) | 135 | 3.0 | 47 | 230 |
| 4 | 100 | MA 0 | None | (b) $2.2 \times 10^{-5}$ (0.0050 wt %) | 0.171 (0.25 wt %) | 125 | 4.0 | 43 | 43 |
| 5 | 95 | MA 2 | Methanol 3 | (a) $1.0 \times 10^{-5}$ (0.003 wt %) | 0.157 (0.23 wt %) | 135 | 3.0 | 46 | 230 |
| 6 | 95 | MA 2 | Toluene 3 | (a) $1.0 \times 10^{-5}$ (0.003 wt %) | 0.157 (0.23 wt %) | 135 | 3.0 | 46 | 230 |
| Comp. Ex. 1 | 98 | MA 2 | None | (c) $1.0 \times 10^{-5}$ (0.0015 wt %) | 0.157 (0.23 wt %) | 165 | 4.0 | 58 | 420 |
| Comp. Ex. 2 | 98 | MA 2 | None | (d) $3.5 \times 10^{-5}$ (0.008 wt %) | 0.157 (0.23 wt %) | 150 | 4.0 | 57 | 3.5 |
| Comp. Ex. 3 | 98 | MA 2 | None | (a) $1.0 \times 10^{-5}$ (0.003 wt %) | 0.157 (0.23 wt %) | 135 | 3.0 | 47 | 230 |
| Comp. Ex. 4 | 98 | MA 2 | None | (a) $1.0 \times 10^{-5}$ (0.003 wt %) | 0.157 (0.23 wt %) | 135 | 3.0 | 47 | 230 |
| Comp. Ex. 5 | 78 | MA 2 | Methanol 20 | (a) $2.5 \times 10^{-5}$ | 0.157 | 135 | 3.0 | 46 | 230 |
| Comp. Ex. 6 | 98 | MA 2 | None | (c) $1.0 \times 10^{-5}$ (0.0015 wt %) | 0.157 | 165 | 3.0 | 58 | 420 |

MA: Methyl acrylate.
Mercaptan: n-Octylmercaptan.
Radical initiator:
(a) 1,1-Bis(tert-butylperoxy)-3,3,5-trimethylcyclohexane.
(b) Dimethyl 2,2'-azobisisobutyrate.
(c) Di-tert-butyl peroxide.
(d) 2,2'-Azobisisobutyronitrile.

TABLE 2

Polymerization conditions in plug flow type reactor

| Example No. | Amount of radical initiator added (moles/mole of monomers) | Reactor temperature (°C.) | Half-life period (sec) | Residence time (min) | Polymer content (wt %) |
|---|---|---|---|---|---|
| 1 | Inlet: (a) $6.6 \times 10^{-6}$ (0.002 wt %) | 150 | 54 | | |
| | Post-addition: None | 150 | | 30 | 58 |
| 2 | Inlet: (a) $6.6 \times 10^{-6}$ (0.002 wt %) | 175 | 8 | | |
| | (c) $1.4 \times 10^{-5}$ (0.002 wt %) | | 250 | | |
| | Post-addition: None | 175 | | 40 | 65 |
| 3 | Inlet: (a) $6.6 \times 10^{-6}$ (0.002 wt %) | 150 | 54 | | |
| | Post-addition: (c) $1.4 \times 10^{-5}$ (0.002 wt %) | 170 | 250 | 40 | 72 |
| 4 | Inlet: (e) $3.9 \times 10^{-6}$ (0.001 wt %) | 150 | 430 | | |
| | Post-addition: None | 150 | | 30 | 58 |
| 5 | Inlet: (a) $6.6 \times 10^{-6}$ (0.002 wt %) | 175 | 8 | | |
| | (c) $1.4 \times 10^{-5}$ (0.002 wt %) | | 250 | | |
| | Post-addition: None | 175 | | 40 | 63 |
| 6 | Inlet: (a) $6.6 \times 10^{-6}$ (0.002 wt %) | 150 | 54 | | |
| | Post-addition: (c) $1.4 \times 10^{-5}$ (0.002 wt %) | 170 | 250 | 40 | 70 |
| Comp. Ex.3 | Inlet: (c) $1.4 \times 10^{-5}$ (0.002 wt %) | 150 | 2000 | | |
| | Post-addition: None | 150 | | 30 | Blocked |
| Comp. Ex.4 | Inlet: (a) $6.6 \times 10^{-6}$ (0.002 wt %) | 150 | 54 | | |
| | Post-addition: (c) $1.4 \times 10^{-5}$ (0.002 wt %) | 150 | 2000 | 40 | Blocked |
| Comp. Ex.5 | Inlet: (a) $6.6 \times 10^{-6}$ (0.002 wt %) | 150 | 54 | | |
| | Post-addition: (c) $1.4 \times 10^{-5}$ (0.002 wt %) | 150 | 2000 | 40 | 60 |
| Comp. Ex.6 | Inlet: (c) $1.4 \times 10^{-5}$ (0.002 wt %) | 175 | 8 | | |
| | Post-addition: None | | | 30 | 68 |

Radical initiator:

(a) 1,1-Bis(tert-butylperoxy)-3,3,5-trimethylcyclohexane. Ten-hour half-life period temperature: 90° C.

(c) Di-tert-butyl peroxide. Ten-hour half-life period temperature: 124° C.

(e) 2,2'-Azobis(2,4,4-trimethylpentane). Ten-hour half-life period temperature: 110° C.

TABLE 3

| Example No. | Residual monomer content (ppm) | Residual dimer content (ppm) | Residual mercaptan (ppm) | Thermal decomposition resistance (° C.) | Weight-average molecular weight (Mw) | S/H ratio |
|---|---|---|---|---|---|---|
| 1 | 250 | 300 | 20 | 304 | 90,000 | 1.26 |
| 2 | 220 | 200 | 20 | 307 | 88,000 | 1.27 |
| 3 | 220 | 160 | 20 | 307 | 90,000 | 1.24 |
| 4 | 280 | 300 | 20 | 300 | 88,000 | 1.31 |
| 5 | 220 | 180 | 20 | 305 | 88,000 | 1.27 |
| 6 | 220 | 150 | 20 | 305 | 90,000 | 1.24 |
| Comp. Ex. 1 | 300 | 2000 | 20 | 286 | 90,000 | 1.14 |
| Comp. Ex. 2 | 290 | 1300 | 20 | 284 | 90,000 | 1.20 |
| Comp. Ex. 5 | 250 | 100 | 20 | 278 | 87,000 | 1.27 |
| Comp. Ex. 6 | 320 | 2600 | 20 | 280 | 90,000 | 1.10 |

What is claimed is:

1. A process for producing a methacrylic polymer wherein one perfect mixing type reactor, a plug flow type reactor which is a tubular reactor having a built-in static mixer and a volatile matter removing device are arranged in series, said process comprising:
   a) reducing the dissolved oxygen content in a mixture comprising one or more monomers to 2 ppm or less;
   b) in the perfect mixing type reactor, effecting continuous solution polymerization of the mixture in the presence of less than 5% by weight of an inert solvent or continuous bulk polymerization at a polymerization temperature of 110 to 160° C., in the presence of 0.01 to 1.0 mole % of a mercaptan compound as a chain-transfer agent and a radical initiator having a half-life period of 10 seconds to 1 hour at the polymerization temperature, by agitating the reaction mixture to make it substantially homogeneous, to form a reaction mixture having a polymer content in the perfect mixing type reactor in the range of 35 to 65% by weight;
   c) continuously withdrawing a portion of the reaction mixture from the perfect mixing type reactor and feeding the reaction mixture to the plug flow type reactor at a pressure that is not less than the vapor pressure of the reaction mixture throughout the plug flow type reactor;
   d) presetting the inner wall temperature of the plug flow type reactor to from 110 to 250° C., and passing the reaction mixture through the plug flow type reactor while polymerizing it by adding thereto and mixing therewith one or more radical initiators having a half-life period of not greater than 1,000 seconds at the inner wall temperature of the plug flow type reactor, so that the polymer content at the outlet of the plug flow type reactor is in the range of 50 to 85% by weight; and
   e) subsequently feeding the resultant reaction mixture to the volatile matter removing device to continuously separate and remove volatile matter.

2. The process for producing a methacrylic polymer as claimed in claim 1, wherein the polymerization temperature in the perfect mixing type reactor is in the range of 120 to 140° C. and the degree of monomer conversion to polymer ranges from 40 to 55% by wt.

3. The process for producing a methacrylic polymer as claimed in claim 1 wherein the polymer is a copolymer containing not less than 80% by weight of polymerized methyl methacrylate units and not greater than 20% by weight of polymerized alkyl acrylate units or alkyl methacrylate units not including methyl methacrylate units.

4. The process for producing a methacrylic polymer as claimed in claim 1 wherein the inner wall temperature of the plug flow type reactor is preset so that the plug flow type reactor is divided into two or more zones from the inlet toward the outlet and the inner wall temperature of one of said zones toward the outlet is higher than a zone toward the inlet.

5. The process for producing a methacrylic polymer as claimed in claim 1 wherein two or more radical initiators are added to and mixed with a reaction mixture immediately before the plug flow type reactor, and the ten-hour half-life period temperature of each radical initiator differs from each other by 5° C. or more.

6. The process for producing a methacrylic polymer as claimed in claim 1 wherein at one position immediately before the inlet of the plug flow type reactor, and at one or more positions within the plug flow type reactor, a radical initiator having a half-life period of not greater than 1,000 seconds at the inner wall temperature of the plug flow type reactor is added to and mixed with the reaction mixture to polymerize it.

7. The process for producing a methacrylic polymer as claimed in claim 1 wherein an unreacted monomer or a mixture comprising one or more unreacted monomers and the inert solvent separated and removed in the volatile matter removing device, is recycled to the perfect mixing type reactor.

8. The process of claim 1, wherein the polymerization in b) is a continuous bulk polymerization.

9. The process of claim 1, wherein in b) the radical initiator is present in an amount not greater than $5.0 \times 10^{-5}$ mol per mol of monomer and not less than $5.0 \times 10^{-6}$ mol per mol of monomer.

10. The process of claim 1, wherein the average residence time in the perfect mixing type reactor is not greater than 5 hours.

11. The process of claim 1, wherein the residence time of the reaction mixture in the plug flow type reactor is from one minute to one hour.

12. A process for producing a methacrylic polymer wherein one perfect mixing type reactor, a plug flow type reactor which is a tubular reactor having a built-in static mixer and a volatile matter removing device are arranged in series, said process comprising:
   a) reducing the dissolved oxygen content in a mixture comprising one or more monomers to 2 ppm or less;
   b) in the perfect mixing type reactor, effecting continuous solution polymerization of the mixture in the presence of less than 5% by weight of an inert solvent or continuous bulk polymerization at a polymerization temperature of 110 to 160° C., in the presence of 0.01 to 1.0 mole % of a mercaptan compound as a chain-transfer agent and a radical initiator having a half-life period of 10 seconds to 1 hour at the polymerization temperature, by agitating the reaction mixture to make it substantially homogeneous, to form a reaction mixture having a polymer content in the perfect mixing type reactor in the range of 35 to 65% by weight;

c) continuously withdrawing a portion of the reaction mixture from the perfect mixing type reactor and feeding the reaction mixture to the plug flow type reactor at a pressure that is not less than the vapor pressure of the reaction mixture throughout the plug flow type reactor;

d) presetting the inner wall temperature of the plug flow type reactor to from 110 to 250° C., and passing the reaction mixture through the plug flow type reactor while polymerizing it by adding thereto and mixing therewith one or more radical initiators having a half-life period of not greater than 1,000 seconds at the inner wall temperature of the plug flow type reactor, so that the polymer content at the outlet of the plug flow type reactor is in the range of 50 to 85% by weight; and e) subsequently feeding the resultant reaction mixture to the volatile matter removing device to continuously separate and remove volatile matter, wherein the inner wall temperature of the plug flow type reactor is preset so that the plug flow type reactor is divided into two or more zones from the inlet toward the outlet and the inner wall temperature of one of said zones toward the outlet is higher than a zone toward the inlet, and wherein at one position immediately before the inlet of the plug flow type reactor, and at one or more positions within the plug flow type reactor, a radical initiator having a half-life period of not greater than 1,000 seconds at the inner wall temperature of the plug flow type reactor is added to and mixed with the reaction mixture.

13. The process for producing a methacrylic polymer as claimed in claim 1 wherein the polymer content at the outlet of the plug flow type reactor ranges from 60 to 80% by wt.

* * * * *